United States Patent Office 3,022,269
Patented Feb. 20, 1962

3,022,269
DETERIORATION RETARDERS FOR RUBBER AND COMPOSITIONS COMPRISING THE SAME
Jacob E. Jansen and Henry J. Kehe, Akron, Ohio, assignors to The B. F. Goodrich Company, New York, N.Y., a corporation of New York
No Drawing. Filed Jan. 9, 1959, Ser. No. 785,794
12 Claims. (Cl. 260—45.95)

This invention relates to alkylated bis-phenols and compositions containing the same, and relates more particularly to tertiary alkyl-substituted bis-phenols and compositions comprising the same wherein the alkylated bis-phenol functions as a deterioration retarder.

The protection of rubbery, unsaturated, organic polymers, particularly natural and the butadiene synthetic rubbers, from degradation by oxygen, light and heat has been a major objective of rubber compounders for many years. Many organic antioxidants and deterioration retarders have been proposed and employed. The most effective class of materials for this purpose has been the diarylamines and their derivatives, for example, phenyl beta naphthylamine. These amine antioxidants, while they are effective as deterioration retarders, have some disadvantages, the most objectionable being that they discolor the rubber products so that they may not be used with light colored or white rubber stocks. Phenols and alkyl phenols have been proposed as non-discoloring antioxidants in place of the diarylamines in light colored rubber stocks and have been successful to some extent in decreasing the discoloration of the rubber compound as it ages, but these compounds do not protect the rubber materials from the other deleterious effects of oxygen and heat as effectively as the diarylamines.

We have now discovered that certain alkylated bis-phenols are highly effective deterioration retarders, being more efficient than the known phenolic antioxidants and as good as the widely used diarylamine antioxidants. In addition they possess excellent non-discoloring and non-staining properties when used in rubber compositions. Accordingly, this invention provides alkylated bis-phenolic deterioration retarders containing from 1 to 4 tertiary alkyl groups on the phenyl nuclei, and compositions of the antioxidant and the rubber wherein the alkylated bis-phenols function effectively as non-discoloring, non-staining deterioration retarders. These alkylated bis-phenols are effective in raw (crude) and vulcanized rubber compositions.

The alkylated bis-phenols most effective for the purposes of this invention are reaction products of certain tertiary olefins and bis-phenols whereby 1 to 4 tertiary olefin molecules are added to the bis-phenol in a position ortho to the hydroxyl groups. The tertiary alkyl-substituted bis-phenols of this invention are prepared, for example, by condensing the tertiary olefin with the bis-phenol in the presence of a condensation catalyst under proper conditions so that the resulting reaction mixture is composed essentially of the alkylated product. The reaction product will naturally contain a mixture of mono-, di- and higher tertiary alkylated bis-phenols which may be fractionated into the separate components. The reaction product is particularly useful in the practice of this invention.

The tertiary olefin employed in preparing the alkylated bis-phenol may contain from 4 to 8 carbon atoms of which the following are examples: isobutylene, isoamylene, 2-methyl pentene-1, 2-ethyl propene-1, 2-ethyl pentene-1, 2-methyl hexene-1, diisobutylene and the like as well as mixtures of these olefins. The bis-phenol preferably reacted with the tertiary olefin is 2,2-bis(4-hydroxyphenyl)propane. Other useful bis-phenols include 2,2-bis(4-hydroxyphenyl)butane, 3,3-bis(4-hydroxyphenyl)pentane, 2,2-bis(4-hydroxyphenyl)pentane, 2,2-bis(4-hydroxyphenyl)hexane, 2,2-bis(4-hydroxyphenyl)-4-methyl pentane, 3,3-bis(4-hydroxyphenyl)hexane, 3,3-bis(4-hydroxyphenyl)heptane, 3,3-bis(4-hydroxyphenyl)-4-methyl hexane, 3,3-bis(4-hydroxyphenyl)-5-methyl hexane, 3,3-bis(4-hydroxyphenyl)-3,4-dimethyl pentane and the like. Mixtures of the tertiary olefins may be employed. The reactants preferably employed are isobutylene and 2,2-bis(4-hydroxyphenyl)propane.

In preparing the compositions of this invention, the tertiary alkylated bis-phenol is obtained by reacting, for example, isobutylene with 2,2-bis(4-hydroxyphenyl)propane in the presence of an acidic condensation catalyst in an organic solvent under the influence of heat. The reaction product after separation from the solvent is a mixture of tertiary alkylated bis-phenols consisting of the mono-, di- and higher tertiary alkylated bis-phenols. The mono- and di-substituted bis-phenols are effective as non-staining non-discoloring antioxidants. It is preferred that the major component of the reaction mixture employed in rubber compositions be higher substituted tertiary alkyl bis-phenols. The reaction mixture may be employed as such or the various tertiary alkyl-substituted bis-phenols separated as by fractional distillation and employed as the fractions.

The condensation reaction is preferably conducted in the presence of an organic solvent inert to the reactants. Such hydrocarbon solvents as hexane, heptane, benzene, toluene and the like are satisfactory. Other usual solvents such as acetic acid may be employed. The reaction is conducted at a temperature preferably above 50° C. A reaction temperature of about 65 to 85° C. results in very satisfactory reaction rates, and temperatures up to the boiling points of the solvents may be employed while pressure reactions may be conducted with lower boiling solvents.

The catalysts employed are acidic condensation catalysts such as sulfuric acid, para-toluene sulfonic acid, boron trifluoride, acid activated clays and the like. Particularly useful are combinations such as sulfuric and finely-divided acid activated clays. Such a combination is useful with low purity reactants. The use of an acid activated clay is particularly advantageous since the reaction mixture has only to be filtered and the solvent removed to be ready for use. In addition the acid activated clay removes many colored and otherwise undesirable reaction by-products. The acid activated clays preferred are those whose major component is aluminum silicate in an amount preferably greater than 50 percent. The clay is preferably of such a particle size that greater than 90 percent of the particles will pass a 325 mesh screen and have a particle size less than 0.05 millimeter. The acid activated clay preferably has an acid reaction or is acid treated with a pH between 1 and 6. The amount of clay employed may be from 0.5 to 10 percent or more. The amount of other acid catalyst required for the condensation reaction may be varied quite widely but is generally from 0.1 to about 5.0 percent by weight of the bis-phenol reactant employed. The amount of catalyst preferred is generally from about 0.5 to 10 percent.

The amounts of the other reactants employed are somewhat critical. In order to obtain a reaction mixture having the greatest activity as an antioxidant, it is necessary to employ about 4 mols of the tertiary olefin to about 1 mol of the bis-phenol. This 4:1 ratio of reactants, under optimum reaction conditions, results in high yield of the higher tertiary alkylated bis-phenol; and the tertiary olefin probably adds to the bis-phenol at positions ortho to the hydroxy groups. Thus, under proper conditions 4 mols of isobutylene react with 1 mol of 2,2-bis(4-hydroxyphenyl)propane to form a mixture of products, and the following compounds may be obtained as major components of the reaction mixture:

(a) The tetra-substituted reaction product

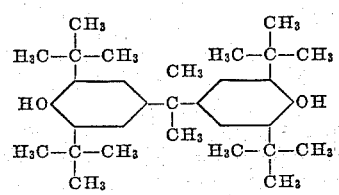

as well as (b) the di-substituted reaction product and (c) the mono-substituted reaction product. These specific chemicals may be obtained by fractional distillation of reaction mixtures and recrystallization from benzene. Lesser amounts of tetra-tertiary butylated product and larger amounts of mono-, di- and tri-substituted products are obtained with lower concentrations of the tertiary olefin, less than 4 mols, and under less favorable reaction conditions.

The reaction product is ordinarily a yellow, relatively viscous oil which has a tendency to crystallize during extended storage periods. This tendency may be overcome by including in the reaction mixture a small amount of an aryl-substituted alkenyl hydrocarbon having the general formua

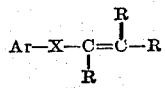

wherein Ar is an aryl hydrocarbon, X is an alkylidene radical containing from 0 to 5 carbon atoms and R is a hydrogen or alkyl radical. Specific aralkenyl compounds which are suitable for this purpose include styrene, alpha-methyl styrene, para-methyl styrene, paramethyl alpha methyl styrene, ethyl styrene, allyl benzene, allyl naphthalene, vinyl naphthalene and the like. Preferred amounts are about 5 to 25 parts of styrene to 100 parts of isobutylene by weight. Expressed in molar ratios, the preferred ratios of isobutylene to styrene range from about 8 to 40 mols of isobutylene to 1 mol of styrene. Another useful method to overcome this crystallization tendency is to use an excess of the tertiary olefin such as isobutylene so that some of the isobutylene forms triisobutylene which acts as an anti-crystallization substance.

The condensation reaction may be carried out in an autoclave equipped with a stirrer, heater, a reflux condenser and inlet tubes for introducing gaseous tertiary olefins at the bottom of the reactor. The reaction is preferably conducted under an inert atmosphere such as nitrogen. A solvent such as benzene is placed in the reactor and the bis-phenol and acidic catalyst added thereto. The mixture is stirred vigorously while heating to a temperature of about 70° C. under a nitrogen atmosphere. The tertiary olefin is preferably added over about a five hour period, and if added at too rapid a rate dimer and trimer may be formed. If an acid activated clay is employed as the catalyst, the reaction mixture is filtered at the end of the reaction and the solvent removed therefrom. If sulfuric acid is employed as a catalyst, it must be neutralized with an alkali such as sodium hydroxide at the end of the reaction, the product washed with water and the two layers which form then separated. The benzene is then stripped from the reaction mixture under reduced pressure. The remaining reaction product may be used as is or further purified by fractional distillation to separate the various tertiary alkyl-substituted bis-phenols.

The reaction products of this application are non-staining, non-discoloring highly efficient oxygen-resisting deterioration retarders for rubbers which undergo deterioration on exposure to the atmosphere, and especially for vulcanizable diolefinic polymers which include all natural rubbers and all vulcanizable synthetic rubbery diolefinic polymers, both unvulcanized and vulcanized. The term "vulcanizable rubbery diolefinic polymer" is employed in the specification and claims hereof to embrace (a) polymers of isoprene, which include the natural rubbers, and polymers of conjugated diolefins including butadiene-1,3, dimethyl butadiene, chlorobutadiene, fluorobutadiene, cyanobutadiene and similar conjugated diolefins; (b) copolymers of these conjugated diolefins with each other; and (c) copolymers of these conjugated diolefins with other unsaturated compounds copolymerizable therewith including monoolefins such as the vinylidene compounds represented by the styrenes, acrylonitriles, acrylic and methacrylic acid and their esters, isobutylene, vinylidene chloride, vinyl pyridine, vinyl esters, vinyl alkyl esters and the like. The method of preparation of the above enumerated rubbery diolefinic polymers is immaterial and the alkylated bis-phenols of this invention may be added to a solution, latex or dry polymer product as is well-known to those skilled in the art. The alkylated bis-phenol may be added as is or in a solution, emulsion, dispersion or the like.

The amount of reaction product employed as a deterioration retarder in a rubbery, diolefinic polymer may be from about 0.1 to about 10 weight percent based on the amount of polymer, but to obtain the maximum value of the reaction product as a non-discoloring, non-staining deterioration retarder, an amount from about 0.5 to 5 weight percent will generally give adequate protection.

The tertiary alkyl-substituted bis-phenols can be readily mixed with the rubbery diolefinic polymers at some stage subsequent to polymerization and prior to drying. They are also readily mixed with rubbery diolefinic polymers at the same time and in the same manner that vulcanizing or curing agents and other compounding ingredients are added. This is the preferred method of incorporating these deterioration retarders into natural crude rubber and results in the antioxidant becoming uniformly dispersed throughout the rubber composition. However, in case of synthetic rubbery diolefinic polymers such as copolymers of butadiene with styrene or acrylonitrile which are ordinarily prepared by copolymerization in an aqueous medium, it is most convenient to add the alkylated bis-phenol compounds in an aqueous dispersion or emulsion to the latex as it comes from the polymerization equipment. This has the added advantage that when the polymer is recovered from the latex by coagulation, the deterioration retarder is already uniformly incorporated throughout the mass of the rubbery diolefinic polymers. The polymer is thus protected from the time it is made through the drying stage and storage period, and deterioration retarder does not have to be added during the compounding.

The preparation of the alkylated bis-phenols and compositions of the same in rubbery diolefinic polymers are more fully set forth in the following examples which are intended to be illustrative only since modifications and variations thereof will be apparent to those skilled in the art.

EXAMPLE

A reaction vessel is equipped with a thermometer, agitator, reflux condenser and inlet openings, including an inlet tube for introducing gaseous isobutylene into the bottom of the vessel. The reaction vessel is charged with 114 grams of 2,2-bis(4-hydroxyphenyl)propane (0.5 mol) which has been washed in benzene, 350 milliliters of benzene and 10 grams of a finely-divided acid activated clay which has a pH of about 3. This mixture is vigorously stirred while heating and nitrogen is introduced at a slow rate to provide a blanket of nitrogen over the mixture. While maintaining the temperature at 70° C. and vigorously stirring, add 21 grams (0.2 mol) of styrene gradually over a period of time, such as thirty minutes, and then add 96 grams (1.7 mols)

of isobutylene gradually over a period of time, such as about three hours. The reaction mixture is then filtered, the acid activated clay being retained in the filter. From the filtrate, benzene is distilled under reduced pressure, as about 15 mm. The resulting reaction product is a yellow viscous material which weighs 227 grams.

The reaction product is tested for the degree of deterioration retardation by compounding with natural rubber in the following recipe:

| Compounding recipe: | Parts by weight |
|---|---|
| Natural rubber | 100.0 |
| Easy processing channel black | 50.0 |
| Zinc oxide | 5.0 |
| Stearic acid | 3.0 |
| Sulfur | 3.0 |
| Benzothiazyl disulfide | 1.0 |

Three compounded stocks are prepared: (1) a blank without deterioration retarder (stabilizer or antioxidant), (2) a control stock with one part of phenyl beta-naphthylamine per hundred of rubber (p.h.r.) and (3) a compound containing one part of the alkylated bis-phenol reaction product of this example per hundred of rubber (p.h.r.). The compounded stocks are cured in a steam press at 280° F. for 60 and 80 minutes. Test dumbbell strips are cut from the vulcanized stock and aged in air in open test tubes for 24 and 48 hours at 212° F. Stress strain results are obtained on both the aged and unaged samples. This test is fully described in ASTM test method D865–48T. Other aged strips are subjected to flexing tests in the De Mattia Flexing Machine where the test strips are flexed and the number of flexures recorded. The flex test is carried out until crack growth has reached a rating of 7, where a rating of 0 represents no cracking and a rating of 10 represents complete break. The ratings are determined by comparison of the crack growth with established standards for each rating. The following test results are obtained:

(I) PROPERTIES OF VULCANIZED RUBBER BEFORE AGING

| Time of Cure | No Antioxidant | | Reaction Product | | PBNA[1] | |
|---|---|---|---|---|---|---|
| | Tensile, p.s.i. | Elongation, percent | Tensile, p.s.i. | Elongation, percent | Tensile, p.s.i. | Elongation, percent |
| 60 min | 4,010 | 510 | 4,270 | 540 | 4,260 | 510 |
| 80 min | 3,180 | 440 | 3,470 | 480 | 3,440 | 500 |

(II) PROPERTIES AFTER AGING 24 HOURS AT 212° F.; PERCENT TENSILE RETAINED

| Time of Cure | No Antioxidant, percent | Reaction Product, percent | PBNA,[1] percent |
|---|---|---|---|
| 60 min | 51 | 82 | 80 |
| 80 min | 44 | 77 | 72 |

(III) PROPERTIES AFTER AGING 48 HOURS AT 122° F.; PERCENT TENSILE RETAINED

| Time of Cure | No Antioxidant, percent | Reaction Product, percent | PBNA,[1] percent |
|---|---|---|---|
| 60 min | 30 | 69 | 53 |
| 80 min | 28 | 80 | 64 |

(IV) FLEX-LIFE—DE MATTIA FLEXURES TO RATING OF 10

| | No Antioxidant | Reaction Product | PBNA[1] |
|---|---|---|---|
| No. of Flexures | 13,000 | 93,000 | 98,000 |
| Ratio to Blank | 1 | 7.2 | 7.5 |

[1] PBNA phenyl beta-naphthylamine.

The deterioration properties of the reaction product of the example are shown in the above tabulations to be superior, or substantially equal, to phenyl beta-naphthylamine, one of the most widely used antioxidants.

The reaction product of the example is tested for staining and discoloring tendencies by incorporating the reaction product into a standard white sidewall tire composition and curing in a standard steam testing press. The recipe employed is:

| Compounding recipe: | Parts by weight |
|---|---|
| Natural rubber | 100.0 |
| Zinc oxide | 85.0 |
| Titanium dioxide | 15.0 |
| Ultramarine blue | 0.2 |
| Stearic acid | 1.0 |
| Hepteen base | 0.3 |
| Sulfur | 3.0 |
| Deterioration retarder | 1.0 |

A blank without deterioration retarder and a control stock containing phenyl beta-naphthylamine as the antioxidant are also compounded for comparison purposes. The cured stocks are exposed to a standard RS sun lamp at a distance of 8 inches for 24 hours to determine discoloration in the stock. In the data table given below, the larger the numerical value of the rating, the greater the discoloration.

*Discoloration*

| | |
|---|---|
| Blank | 2 |
| Reaction product—Example | 1 |
| Phenyl beta-naphthylamine-control | 8 |

The reaction product of this example is tested for staining by taking cured test pieces of the white vulcanizates obtained as described above and placing them between white lacquered and white enameled refrigerator panels for 96 hours at 80° C. at a contact pressure of 1 pound per square inch. In the data table given below, the larger the numerical value of the fractional rating, the greater the stain.

*Staining*

| | |
|---|---|
| Blank | 0.2 |
| Reaction product—Example | 0.2 |
| Phenyl beta-naphthylamine-control | 4.0 |

The smaller fractional rating of staining and discoloration in the stock containing the reaction product of the example clearly shows the superiority of the alkylated bis-phenols of this invention over the standard control antioxidant, phenyl beta-naphthylamine.

When alkylated bis-phenols of the type described are prepared using other catalysts such as sulfuric acid, paratoluene sulfonic acid, or boron trifluoride, similar excellent results are obtained. When other tertiary olefins such as diisobutylene are employed, useful products are also obtained. Bis-phenols of the type described other than the ones employed in the example given above likewise may be utilized to obtain useful non-discoloring, non-staining deterioration retarders. When these products are employed in rubber compounds and with other types of unsaturated, rubbery, organic polymers that are well-known to those skilled in the art, similar excellent results are obtained in the protection of both unvulcanized and vulcanized compositions. Products so stabilized are extremely useful in applications where non-staining, non-discoloring stocks are employed such as refrigerator gaskets, white sidewall tires, light colored gloves, bathing caps and similar articles.

Although this invention has been illustrated by means of specific examples, we do not thereby intend or desire to limit the invention solely thereto, for as heretofore stated, the precise proportions and types of materials used may be varied, and obviously equivalent materials, as defined in the specification, may be employed, if desired, without departing from the spirit and scope of the invention as defined in the appended claims.

The inventive subject matter of this application is fully disclosed in, and is a continuation-in-part of our earlier application Serial No. 372,389, filed August 4, 1953, now U.S. Patent No. 2,877,209, issued March 10, 1959.

We claim:

1. As a new composition of matter, the reaction product of 2,2-bis(4-hydroxyphenyl)propane and two olefins, one olefin being selected from the class of alkenyl olefins consisting of isobutylene and diisobutylene and the other olefin being selected from the class of aralkenyl olefins consisting of styrene, alpha-methyl styrene, para-methyl styrene, para-methyl alpha-methyl styrene and ethyl styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are made up of about 8 to 40 mols of the alkenyl olefin to 1 mol of the aralkenyl olefin.

2. As a new composition of matter, the reaction product of 2,2-bis(4-hydroxyphenyl)propane and two olefins, one olefin being selected from the class of alkenyl olefins consisting of isobutylene and diisobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 8 to 40 mols of the alkenyl olefin to 1 mol of styrene.

3. As a new composition of matter, the reaction product of 2,2-bis(4-hydroxyphenyl)propane and two olefins, one olefin being isobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 5 to 25 parts by weight of styrene to 100 parts by weight of isobutylene.

4. As a new composition of matter, the reaction product of 2,2-bis(4-hydroxyphenyl)propane and two olefins, one of the olefins being diisobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 8 to 40 mols of the diisobutylene to about 1 mol of the styrene.

5. A rubbery composition comprising an unsaturated rubbery diolefinic polymer selected from the class consisting of a polymer of a conjugated diolefin and a copolymer of a conjugated diolefin with a monoolefin through which unsaturated rubbery diolefinic polymer is dispersed from about 0.1 to 10 weight percent based on the weight of the unsaturated rubbery diolefinic polymer of a deterioration retarder comprising the reaction product of 2,2-bis(4-hydroxyphenyl)propane and two olefins, one olefin being selected from the class of alkenyl olefins consisting of isobutylene and diisobutylene, and the other olefin being selected from the class of aralkenyl olefins consisting of styrene, alpha-methyl styrene, para-methyl styrene, para-methyl alpha-methyl styrene and ethyl styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are made up of about 8 to 40 mols of the alkenyl olefin to 1 mol of the aralkenyl olefin.

6. A rubbery composition comprising an unsaturated rubbery diolefinic polymer selected from the class consisting of a polymer of a conjugated diolefin and a copolymer of a conjugated diolefin with a monoolefin through which unsaturated rubbery diolefinic polymer is dispersed from about 0.1 to 10 weight percent based on the weight of the unsaturated rubbery diolefinic polymer of a deterioration retarder comprising the reaction product of 2,2-bis(4-hydroxyphenyl)propane and two olefins, one olefin being selected from the class of alkenyl olefins consisting of isobutylene and diisobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 8 to 40 mols of the alkenyl olefin to 1 mol of styrene.

7. A rubbery composition comprising an unsaturated rubbery diolefinic polymer selected from the class consisting of a polymer of a conjugated diolefin and a copolymer of a conjugated diolefin with a monoolefin through which unsaturated rubbery diolefinic polymer is dispersed from about 0.1 to 10 weight percent based on the weight of the unsaturated rubbery diolefinic polymer of a deterioration retarder comprising the reaction product of 2,2-bis(4-hydroxyphenyl)propane and two olefins, one olefin being isobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 5 to 25 parts by weight of styrene to 100 parts by weight of isobutylene.

8. A rubbery composition comprising an unsaturated rubbery diolefinic polymer selected from the class consisting of a polymer of a conjugated diolefin and a copolymer of a conjugated diolefin with a monoolefin through which unsaturated rubbery diolefinic polymer is dispersed from about 0.1 to 10 weight percent based on the weight of the unsaturated rubbery diolefinic polymer of a deterioration retarder comprising the reaction product of 2,2-bis(4-hydroxyphenyl)propane and two olefins, one of the olefins being diisobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 8 to 40 mols of the diisobutylene to about 1 mol of the styrene.

9. A sulfur-vulcanized composition comprising an unsaturated rubbery diolefinic polymer selected from the class consisting of a polymer of a conjugated diolefin and a copolymer of a conjugated diolefin with a monoolefin through which said sulfur-vulcanized composition is dispersed from about 0.1 to about 10 weight percent based on the weight of said unsaturated rubbery diolefinic polymer of a deterioration retarder comprising the reaction product of 2,2-bis(4-hydroxyphenyl)propane and two olefins, one olefin being selected from the class of alkenyl olefins consisting of isobutylene and diisobutylene and the other olefin being selected from the class of aralkenyl olefins consisting of styrene, alpha-methyl styrene, para-methyl styrene, para-methyl alpha-methyl styrene and ethyl styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are made up of about 8 to 40 mols of the alkenyl olefin to 1 mol of the aralkenyl olefin.

10. A sulfur-vulcanized composition comprising an unsaturated rubbery diolefinic polymer selected from the class consisting of a polymer of a conjugated diolefin and a copolymer of a conjugated diolefin with a monoolefin through which said sulfur-vulcanized composition is dispersed from about 0.1 to about 10 weight percent based on the weight of said unsaturated rubbery diolefinic polymer of a deterioration retarder comprising the reaction product of 2,2-bis(4-hydroxyphenyl)propane and two olefins, one olefin being selected from the class of alkenyl olefins consisting of isobutylene and diisobutylene and the other olefin being styrene, the reaction being carried out in an organic solvent inert to the reactants in the presence of an acidic condensation agent and at a temperature ranging from about 50° C. up to the boiling point of the inert organic solvent and in which about 1 mol of the 2,2-bis(4-hydroxyphenyl)propane and about 4 mols of the two olefins taken as a whole are brought into reactive contact and in which the two olefins are present in about 8 to 40 mols of the alkenyl olefin to 1 mol of styrene.

11. A sulfur-vulcanized composition comprising an unsaturated rubbery diolefinic polymer selected from the class consisting of a polymer of a conjugated diolefin and a copolymer of a conjugated diolefin with a monoolefin through which said sulfur-vulcanized composition is dispersed from about 0.1 to about 10 weight percent based on the weight of said unsaturated rubbery diolefinic polymer of a deterioration retarder comprising the reaction product of 2,2-bis(4-hydroxyphenyl)propane and two olefins, one olefin being isobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 mols of the two olefins taken as a whole are brought into reactive contact and in which the two olefins are present in about 5 to 25 parts by weight of styrene to 100 parts by weight of isobutylene.

12. A sulfur-vulcanized composition comprising an unsaturated rubbery diolefinic polymer selected from the class consisting of a polymer of a conjugated diolefin and a copolymer of a conjugated diolefin with a monoolefin through which said sulfur-vulcanized composition is dispersed from about 0.1 to about 10 weight percent based on the weight of said unsaturated rubbery diolefinic polymer of a deterioration retarder comprising the reaction product of 2,2-bis(4-hydroxyphenyl)propane and two olefins, one of the olefins being diisobutylene and the other olefin being styrene, the reaction being carried out in an organic solvent inert to the reactants in the presence of an acidic condensation agent and at a temperature ranging from about 50° C. up to the boiling point of the inert organic solvent, and in which about 1 mol of the 2,2-bis(4-hydroxyphenyl)propane and about 4 moles of the two olefins taken as a whole are brought into reactive contact and in which the two olefins are present in about 8 to 40 mols of the diisobutylene to about 1 mol of the styrene.

References Cited in the file of this patent

UNITED STATES PATENTS

| | | |
|---|---|---|
| 2,636,905 | Kehe et al. | Apr. 28, 1953 |
| 2,734,088 | Knowles et al. | Feb. 7, 1956 |
| 2,745,726 | Young et al. | May 15, 1956 |

UNITED STATES PATENT OFFICE
CERTIFICATE OF CORRECTION

Patent No. 3,022,269                        February 20, 1962

Jacob E. Jansen et al.

It is hereby certified that error appears in the above numbered patent requiring correction and that the said Letters Patent should read as corrected below.

Column 2, line 40, after "sulfuric" insert -- acid --; column 5, in the heading to table (III), for "122° F." read -- 212° F. --; same column 5, in the footnote of the tables, after "PBNA" insert -- = --.

Signed and sealed this 10th day of July 1962.

(SEAL)
Attest:

ERNEST W. SWIDER
Attesting Officer

DAVID L. LADD
Commissioner of Patents